UNITED STATES PATENT OFFICE 2,059,597

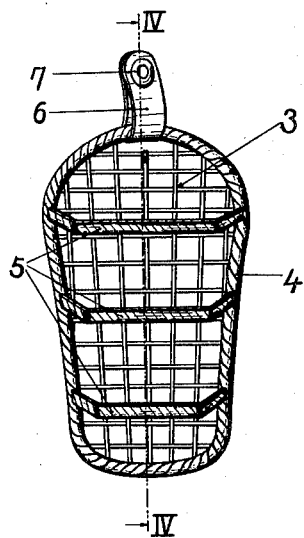
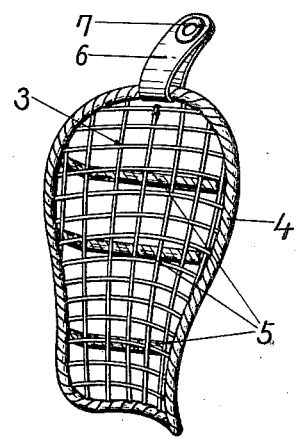
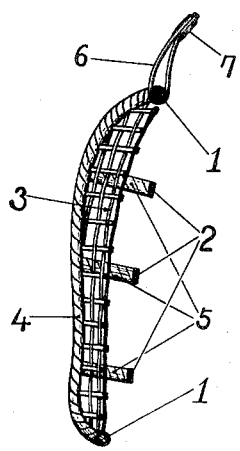
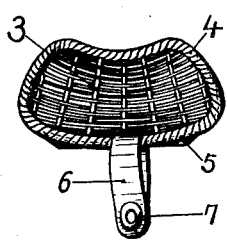
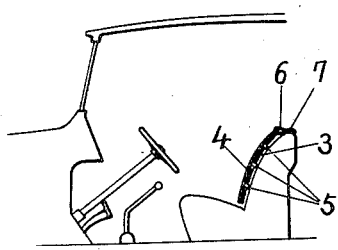

BACK REST

Kinji Okano, Yanagawa-Shinden, Wakamatsu-Mura, Kashima-Gun, Ibaraki-Ken, Japan, assignor to Kabushiki Kaisha L. Leybold Shokwan, Tokyo, Japan, a corporation of Japan, and Heitaro Kobayashi, Choshi-City, Japan Application June 22, 1935, Serial No. 27,952

1 Claim. (Cl. 155—182)

My invention relates to improvements in back rests.

The object of my invention is to provide an improved construction for a back rest which can be placed against the back of an automobile seat, for example, which is relatively simple in construction and economical to manufacture, and which is so constructed that it conforms comfortably to the back of the user, and provides for ventilation.

For the purpose of illustrating my invention an embodiment thereof is shown in the drawing, wherein;

Figure 1 is a rear elevational view of a back rest constructed in accordance with my invention;

Fig. 2 is a perspective front view;

Fig. 3 is a plan view of Fig. 1;

Fig. 4 is a sectional view, the section being taken on the line IV—IV in Fig. 1; and Fig. 5 is a simplified fragmentary view showing the manner in which my improved back rest might be applied to the back of the driver's seat of an automobile.

With reference to the drawing, my improved back rest comprises a four-sided frame 1 of wood, iron or other suitable material. As shown more clearly in Fig. 1, two opposite sides of the frame are disposed at an angle with respect to each other, and are substantially longer than the other two opposite sides.

Substantially U-shaped ribs 2 extend transversely across the frame 1 and are secured at their ends to the longer sides of the frame, all of the ribs 2 being disposed on the same side of the frame, as shown more clearly in Fig. 4.

The adjacent ends of the longer sides of the frame 1 are bent, as shown in Fig. 4, to offset the shorter sides substantially from the plane of the longer sides and in the direction of the ribs 2.

The ribs 2 may be of wood or metal, and may be wound or covered with rattan or other suitable material 5. The frame 1, also, may be wound or covered with rattan or other suitable material 4.

Back-supporting means in the form of a net 3 of rattan or other suitable material, is secured to the frame 1 around the latter, and is concave in the direction of the ribs 2 and as determined by the configuration and construction of the frame.

The back rest is provided with a strap 6 having a conventional form of snap-fastener 7 for holding the device in place against the back of a seat, as shown in Fig. 5.

I claim as my invention:

A back rest comprising a four-sided frame in which two opposite sides are disposed at an angle with respect to each other and are substantially longer than the other two opposite sides, substantially U-shaped ribs extending transversely across said frame and secured at their ends to the longer sides of said frame and all disposed on the same side of said frame, the adjacent ends of the longer sides being bent to offset the shorter sides substantially from the plane of the longer sides and in the direction of said ribs, and back-supporting means secured to said frame around the latter and being concave in the direction of said ribs and as determined by the configuration and construction of said frame, as specified.

KINJI OKANO.